United States Patent [19]

Moen

[11] 4,305,419

[45] Dec. 15, 1981

[54] SELF-CLEANING WATER FAUCET VALVE CONSTRUCTION

[75] Inventor: Alfred M. Moen, Grafton, Ohio

[73] Assignee: Stanadyne, Inc., Windsor, Conn.

[21] Appl. No.: 11,405

[22] Filed: Feb. 12, 1979

[51] Int. Cl.³ .................... F16K 11/18; F16K 25/00
[52] U.S. Cl. ............................. 137/243; 137/625.17;
    137/625.41; 137/454.6
[58] Field of Search ..................... 137/242, 243, 243.1,
    137/625.17, 625.41, 454.6

[56] References Cited

U.S. PATENT DOCUMENTS

| | | | |
|---|---|---|---|
| 337,438 | 3/1886 | Royce | 137/242 |
| 3,103,231 | 9/1963 | Moen | 137/625.17 |
| 3,269,413 | 8/1966 | Weaver | 137/625.17 |
| 3,324,884 | 6/1967 | Dornaus | 137/625.17 |
| 3,415,280 | 12/1968 | Bucknell et al. | 137/625.17 |
| 3,840,048 | 10/1974 | Moen | 137/454.6 |

*Primary Examiner*—Martin P. Schwadron
*Assistant Examiner*—A. Michael Chambers
*Attorney, Agent, or Firm*—Kinzer, Plyer, Dorn & McEachran

[57] ABSTRACT

A self-cleaning valve includes a fixed valve member having inlet means, a movable valve member positioned adjacent the fixed valve member and having an inlet port movable into register with said inlet means, and seal means carried by the fixed valve member and in sealing engagement with the movable valve member. A shear member is positioned on the opposite side of the movable valve member from the seal means and is in intimate contact with the movable valve member. Movement of the movable valve member to control the flow of fluid passing from the inlet means to the inlet port causes the inlet port to slidingly move adjacent and between the shear member and the fixed valve member to remove or break up foreign material held by the inlet port.

5 Claims, 11 Drawing Figures

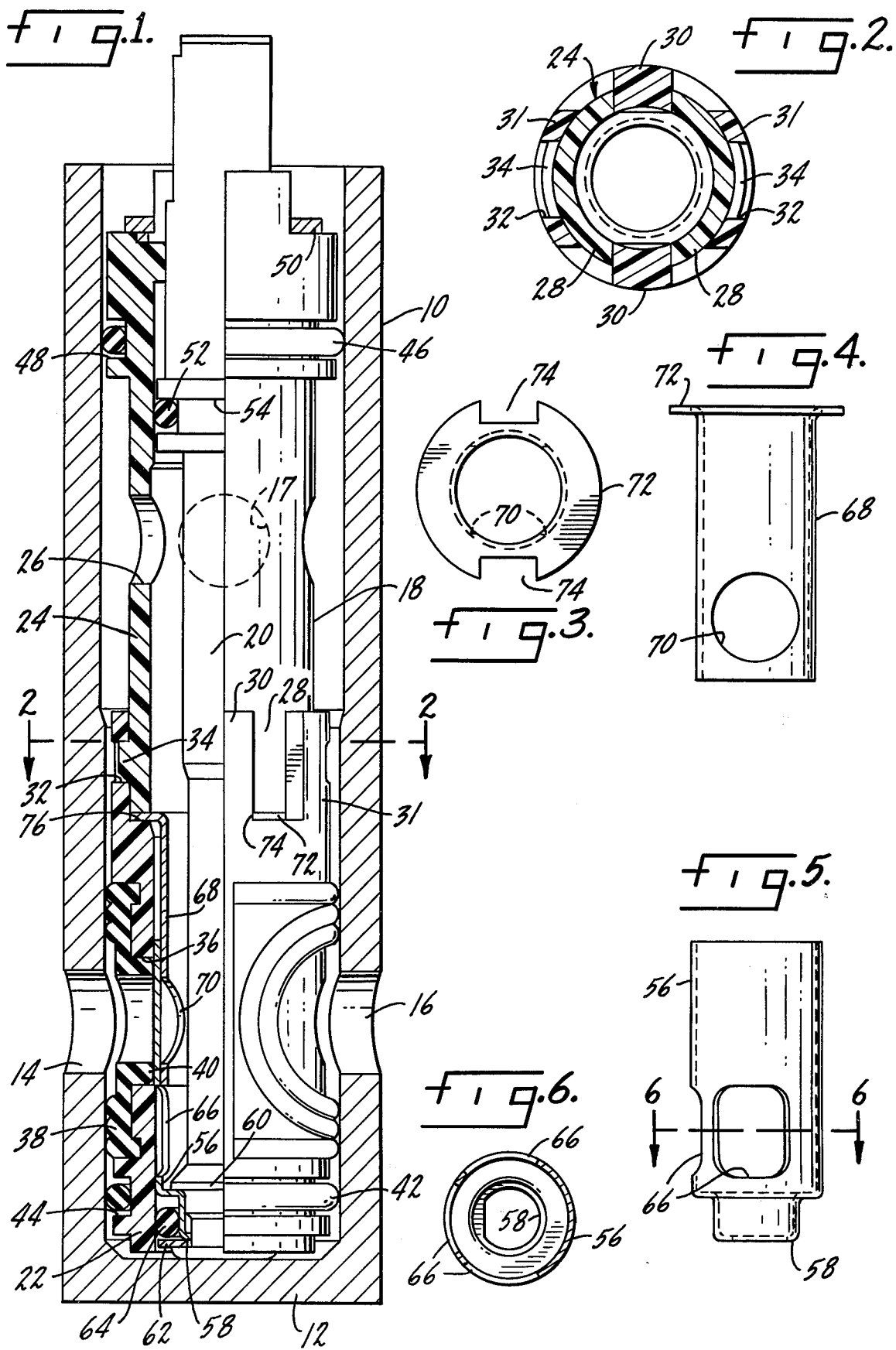

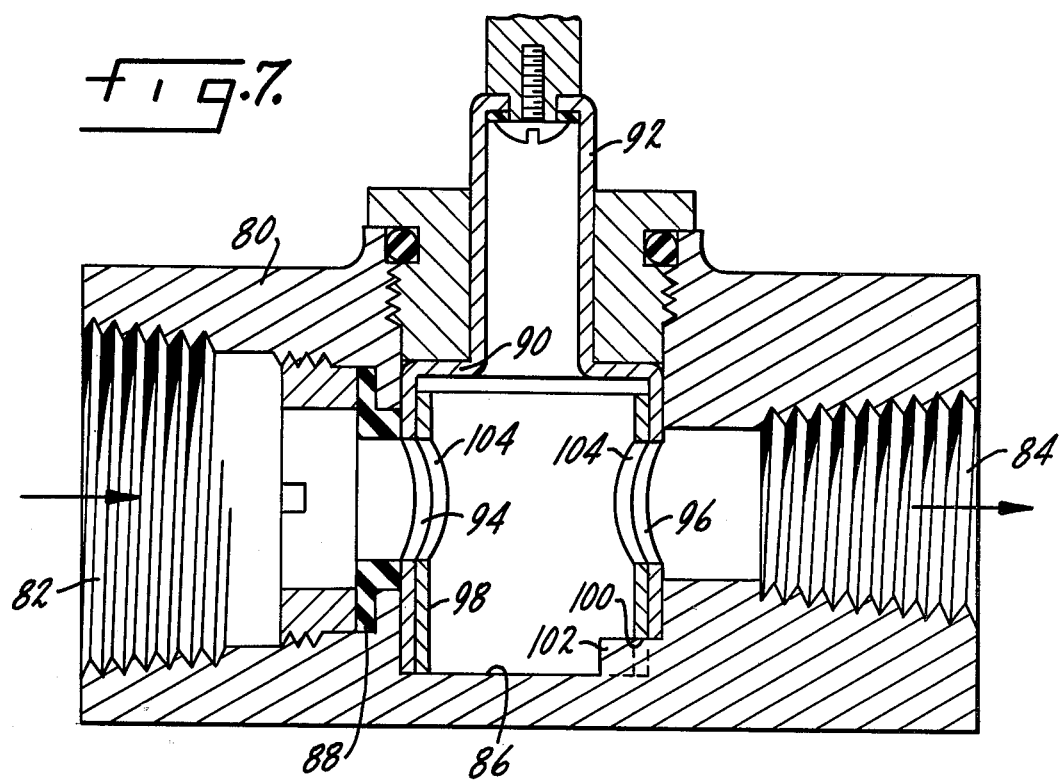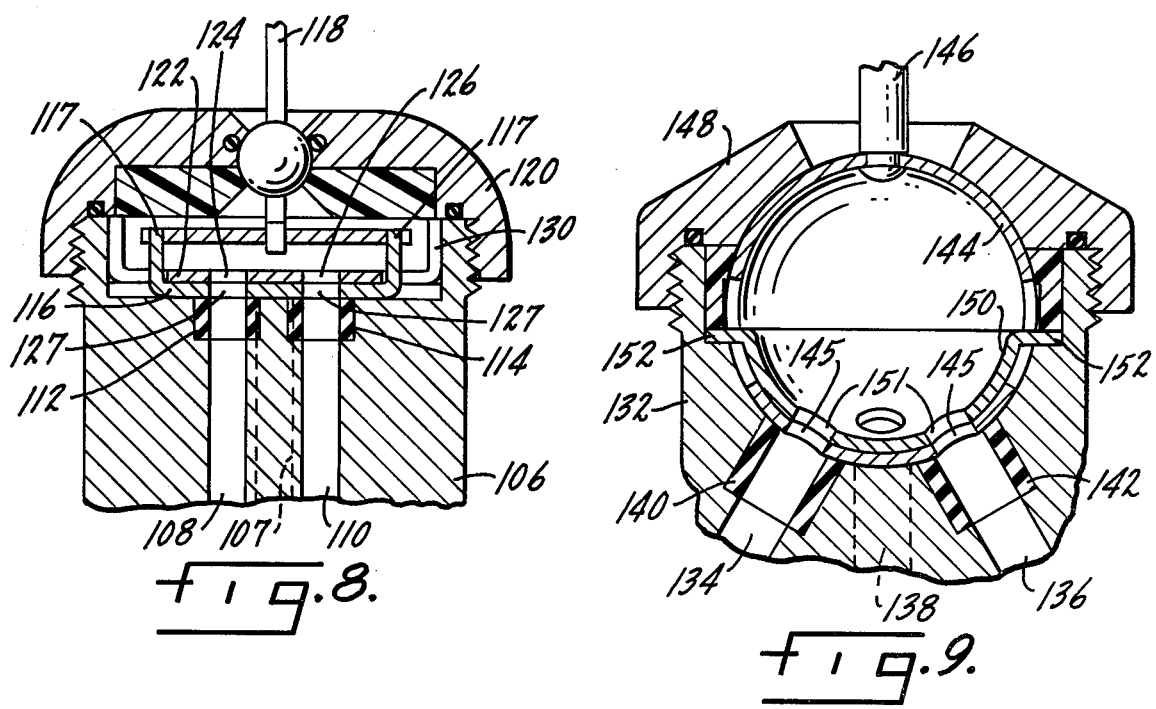

SELF-CLEANING WATER FAUCET VALVE CONSTRUCTION

SUMMARY OF THE INVENTION

The present invention relates to valves and in particular to a self-cleaning valve which is adapted to remove or break up foreign matter commonly caught in the valve inlet port.

One purpose of the invention is a faucet mixing valve which, when operated, will break up or remove foreign matter caught within the valve.

Another purpose is a mixing valve utilizing a shear member within the valve and positioned relative to a movable valve member to clip, shear or break up foreign matter caught within the inlet port of the movable valve member.

Another purpose is a valve of the type described in which the movable valve member inlet port moves between a shear member and a fixed valve member, thereby causing the removal and elimination of foreign material held thereby.

Another purpose is a mixing valve in which a cylindrical shear member is positioned within a cylindrical valve member movable within a sleeve whereby the inlet port of the cylindrical valve member moves between the shear member and the sleeve during operation to remove foreign matter carried thereby.

Other purposes will appear in the ensuing specification, drawings and claims.

BRIEF DESCRIPTION OF THE DRAWINGS

The invention is illustrated diagrammatically in the following drawings wherein:

FIG. 1 is an axial section through a mixing valve of the type described,

FIG. 2 is a section along plane 2—2 of FIG. 1,

FIG. 3 is a top view of the shear member,

FIG. 4 is a side view of the shear member,

FIG. 5 is a side view of a portion of the valve member,

FIG. 6 is a section along plane 6—6 of FIG. 5,

FIG. 7 is a section through a modified form of valve construction,

FIG. 8 is a section through yet a further modified form of valve construction,

FIG. 9 is a section through an additional form of valve construction embodying the principles disclosed herein.

DESCRIPTION OF THE PREFERRED EMBODIMENT

Figure 10:
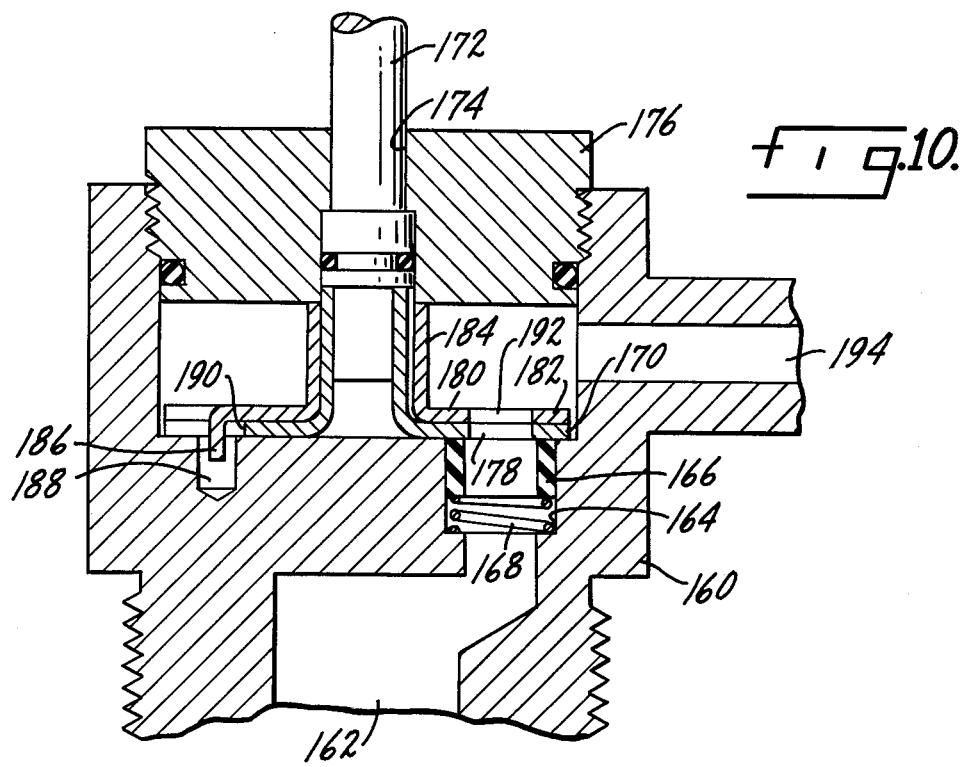
FIG. 10 is a section through yet a further form of valve construction embodying the principles disclosed herein.

The present invention relates to faucets, particularly mixing faucets, but has substantially wider application and is adaptable not only to mixing faucets, but double-handled faucets, as well as control valves which merely regulate the volume of water passing through a given valve construction. Basically, the valve is self-cleaning in that it provides a means for eliminating or breaking up foreign material or matter held by the inlet port of a movable valve member.

In new housing construction it is quite common to find pipe thread chips and solder droppings in the water system, particularly prior to the time that the homeowner begins use of the water system. Normally the plumber, after completing installation, will operate all of the faucets in the water system to insure that they are functioning properly. If there are in fact pipe thread chips, solder droppings or other types of foreign matter such as stones, nails, wood chips and the like, once the water system is turned on such chips will be directed toward the faucets. As the faucets are operated, and normally there is a rapid opening and closing of the faucet to test it, such foreign matter can become caught in the inlet port of the movable valve member. When such material is caught in the inlet port, and as the valve is rapidly opened and closed, the seal members of the valve are cut to the point where the valve will leak once the home owner begins use of the water system. As normally plumbers do not have time to completely flush a water system before operating the faucets, it is not uncommon for valves and faucets, when installed, to have the seals cut so that the valves are leaky, causing the plumber to return to the home and replace the seals and/or the entire faucet.

The present invention is specifically directed toward a self-cleaning faucet which will eliminate such foreign material or will prevent it from being held by the faucet in a manner to cut the seal.

The mixing valve shown in FIGS. 1-6 has certain similarities with the valve in my U.S. Pat. No. 3,840,048 and also has certain similarities with the valve construction shown in my co-pending application Ser. No. 925,538, filed July 19, 1978 now abandoned.

A cylindrical valve housing is indicated generally at 10 and may have a closed bottom 12 and hot and cold water inlet ports 14 and 16. The outlet port for the housing is shown at 17. Positioned within housing 10 is a valve construction which may be in the form of a cartridge as shown in a number of my prior patents. The valve construction includes a sleeve 18 and a movable stem or valve member 20.

The sleeve, cylindrical in form, has an inner sleeve section 22 with an open bottom, and an outer sleeve section 24 having a plurality of outlet ports 26. The inner and outer sleeve sections may conveniently be formed of a suitable plastic and are held together by a snap joint which includes inwardly-extending projections 28 on outer sleeve member 24 and interlocking outwardly-extending projections 30 on inner sleeve member 22. Projections 31 have a recess 32 which fits over an outwardly-extending key 34 on the mating portion of outer sleeve member 24. Thus, the two sleeve sections may be pushed together with the recesses 32 and keys 34 providing a firm interlock. Hereinafter, the sleeve, although made of sections, will be referred to as a unitary construction to simplify the description.

The sleeve may have oppositely-spaced inlet ports 36 in register with housing ports 14 and 16 and there may be a rubber seal structure 38 at each inlet port. Details of this seal are shown in the above-mentioned U.S. Pat. No. 3,840,048. The seal is attached to the sleeve and has an inwardly-directed port seal portion 40 which bears against and is in sealing contact with the movable valve member.

The sleeve is completed by an inner seal ring 42 held in a groove 44 and in sealing contact with the sleeve and housing. Similarly, there is an outer seal ring 46 held by a groove 48 on the sleeve and again in sealing contact with the housing and sleeve.

The valve stem or movable valve member is both reciprocally and rotatably movable relative to the sleeve to control both volume and temperature of water flowing through the valve, again as described in the above-mentioned patent. The valve member and sleeve are keyed together, as at 50 in the manner shown in the above-mentioned patent for proper alignment of the inlet and outlet ports. The valve member includes a seal ring 52 positioned within a groove 54 which seal ring is in sealing contact with both the sleeve and valve member to prevent leakage of water outwardly of the valve. At the inner end of the valve member there is a piston which may be formed of stainless steel and is indicated at 56. Piston 56 has an inwardly-directed portion 58 which cooperates with a shoulder 60 and a retaining member 62 on the valve member along with a seal ring 64 to securely hold the piston portion to the main part of the valve member. Piston 56 has, as clearly shown in FIGS. 5 and 6, spaced inlet ports 66 which are movable into register with inlet ports 36 on the sleeve whereby the volume and temperature of water passing into the valve member may be controlled.

As particularly illustrated in FIG. 1, a cylindrical shear member 68, for example formed of stainless steel, is positioned directly adjacent and inside of piston 56 whereby movement of the valve member causes the piston to move between the shear member and the interior surface of the sleeve. Shear member 68 has inlet ports 70 in register with the sleeve inlet ports and has an outwardly-directed shoulder 72 which is used to attach the shear member to the sleeve. Shoulder 72 has notches 74 whereby when the shoulder is seated upon a shoulder 76 of inner sleeve member 20, there is no interference with the projections described above which are used to hold the two sleeve sections together.

In operation, the valve member is both rotated and reciprocated to control the volume and temperature of water flowing through the valve. Movement of the valve member will cause the piston to move between and in intimate contact with both shear member 68 and the interior surface of the sleeve. Any foreign particles or foreign matter caught by or held by piston inlet ports 66 will be either eliminated or broken up as the stainless steel piston moves in the manner described. The shearing action by the two stainless steel surfaces sliding upon each other will cause particles caught in the piston inlet ports to be either disintegrated, destroyed, broken up or expelled outwardly through the sleeve and housing inlet ports. The action of the two stainless steel members sliding upon each other is effective to cause removal of the above-described foreign material or particles.

The remaining figures in the application adapt the shear principle described above to different types of valve constructions. It should be understood that in all valve constructions illustrated in FIGS. 7-11, the valve constructions are only diagrammatic with the primary purpose being to illustrate the application of the shear principle to different types of valves.

In FIG. 7 a housing 80 may have an inlet port 82 and an outlet port 84. There is a cavity 86 within the housing and a seal member 88 is fixed in position within the housing adjacent the cavity and in communication with inlet port 82. A movable valve member, cylindrical in form, is indicated at 90 and is positioned within the cavity and has an outwardly-extending stem 92 for use in moving the valve member to control the flow of fluid through the housing. Valve member 90 has an inlet port 94 and an outlet port 96 which, when in the position shown, will cause fluid to flow directly through the housing. A cylindrical shear member 98 is positioned within the valve member and is in intimate contact with its inner surface. Again, both the valve member and the shear member may be formed of metal and stainless steel has been found to be highly satisfactory. There is a notch 100 in the shear member which cooperates with a projection 102 formed within the cavity to hold the shear member against rotation during the period that the valve member is moved. The shear member has ports 104 which are in register with the inlet and outlet ports of the housing and are placed in register with the inlet and outlet ports of the movable valve member when the valve is in the open position. The shear member operates in the same manner as in the form of FIGS. 1-6 as it is effective to eliminate particles caught in the movable valve member inlet port.

The construction of FIG. 8 illustrates what is known as a flat mixing valve. There is a housing 106 having an outlet passage 107 and inlet passages 108 and 110 terminating in ports each of which has a seal member 112 and 114 positioned therein. The seal members are in contact with a generally flat movable valve member 116, the position of which is controlled by a stem 118 extending outwardly through an outer housing 120. Rotation and rocking of stem 118 causes movement of valve member 116 thereby varying the volume and temperature of water flowing from passages 108 and 110.

A shear member, again flat in form, at least in those portions in contact with movable member 116, is indicated at 122 and has a pair of ports 124 and 126 which are in register with the housing inlet ports and also in register with inlet ports 127 in the movable valve member. Shear member 122 has an upwardly extending wall 130 notched to receive the upwardly-extending tabs 117 of the valve member. The shear member is fixed against movement by cooperating surfaces on the housing 106 and cover 120. Again, the construction of FIG. 8 provides for self-cleaning in that it eliminates or removes foreign matter caught in the valve member inlet ports to prevent such material from cutting or otherwise ruining the seal members 112 and 114.

In the construction of FIG. 9, a housing 132 has inlet passages 134 and 136 and an outlet passage 138. Seal members 140 and 142 are positioned in enlarged portions of the inlet passages and are in contact with one surface of a generally spherical valve member 144 having inlets 145. Movement of valve member 144 is controlled by a stem 146 which extends outwardly from an upper housing or cover 148. Valve member 144 moves within a spherical cavity in the housing and there is a shear member 150, again spherical in form, having ports 151 positioned on the opposite side of valve member 144 from the seal members and housing. The shear member and the valve member are preferably metal and stainless steel has been found to be a practical material. The shear member has outwardly-extending projections 152 which pass through notches in the valve member and are used to hold the shear member against movement at such time as the valve member is moved to control the flow of water through the valve. As is well known, stem 146 will rock back and forth in two directions to control the flow of water.

In the construction of FIG. 10, a housing 160 has an inlet passage 162 terminating in an enlargement 164 seating a seal ring or seal member 166. Seal member 166 is biased by a spring 168 into sealing relationship with a rotatably movable valve member 170. Valve member 170 has an outwardly-extending stem 172 which controls movement with the stem extending through a bore 174 in a housing member 176. A port 178 in the valve member is positioned to be moved into register with the termination of passage 162. A shear member 180 having a flat portion 182 is positioned against valve member 170 and has an upwardly-extending cylindrical portion 184 positioned adjacent a similar cylindrical portion of the valve member. A key 186, integral with the shear member may extend into an opening 188 in the housing and may pass through a slot, arcuate in form, indicated at 190 and formed in the valve member.

The operation of the construction of FIG. 10 is the same as described before. The mating or intimate contacting metal surfaces of the valve member moving between the shear member and housing eliminates particles caught or held by the inlet port 178 of the valve member. Rotation of the valve member is effective to control the flow of water from passage 162 through port 178 in the valve member and through an aligned port 192 in the shear member which is in communication with an outlet passage 194 in the housing.

Figure 11:
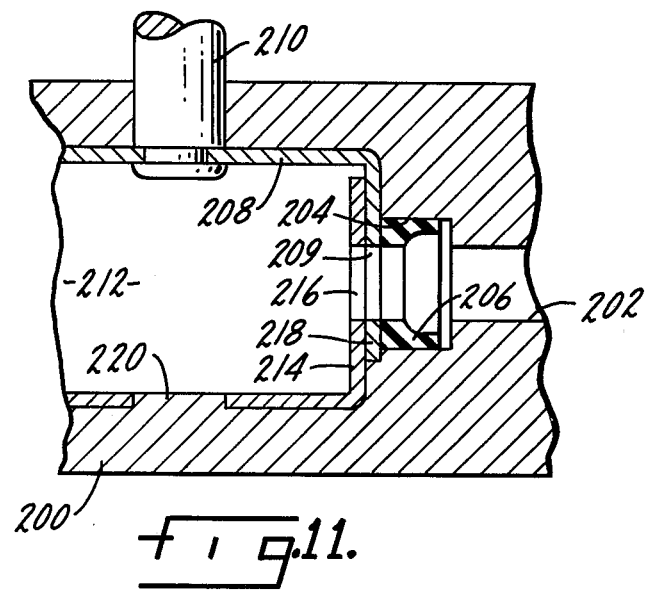
FIG. 11 is a section through a modified form of valve construction embodying the principles disclosed herein.

In the valve of FIG. 11 there is a housing 200 and an inlet passage 202. An enlarged portion 204 of passage 202 mounts a seal member 206 which is in contact with one side of a movable cylindrically-shaped valve member 208. Movement of the valve member is controlled by a stem 210 extending outwardly from the housing. On the opposite side of the valve member is a cavity 212 which may have an outlet port. It is the purpose of the valve construction shown herein to control the flow of fluid from passage 202 into the cavity or chamber. A cylindrical shear member 214 having a port 216 in register with passage 202 is positioned adjacent and in contact with a portion 218 of valve member 208. There is an upstanding projection 220 formed in the housing which serves to prevent movement of and to interlock the shear member with the housing.

During rotation of the valve member caused by stem 210 it will be in intimate contact with mating cylindrical surfaces of the shear member and housing to again eliminate foreign material which may be held in port 209 of the valve member.

Whereas the preferred form of the invention has been shown and described herein, it should be realized that there may be many modifications, substitutions and alterations thereto.

The embodiments of the invention in which an exclusive property or privilege is claimed are defined as follows:

1. A self-cleaning valve including a fixed valve member having inlet means and outlet means therein, movable valve member positioned adjacent said fixed valve member and having an inlet port therein movable into register with said inlet means, flexible steel means carried by said fixed valve member and including a ported portion extending through said inlet means and into sealing engagement with said movable valve member, and a shear member fixed relative to said fixed valve member positioned on the opposite side of said movable valve member from said seal means and in intimate contact with said opposite side of said movable valve member, said shear member having an inlet port therein in register with said fixed valve member inlet means and said flexible seal means ported portion, movement of said movable valve member to control the flow of fluid passing from said inlet means through said fixed member, movable valve member, and shear member inlet ports to said outlet means causing said valve member inlet port to slidingly move adjacent said seal means portion and into alignment with said shear member inlet port to remove or break up foreign material held by said valve member and said shear member inlet ports, said seal means portion including a portion abutting said shear member through said movable valve member inlet port when opened.

2. The valve of claim 1 further characterized in that said movable valve member and shear member are cylindrical at least in the area of contact.

3. The valve member of claim 2 further characterized in that said fixed valve member, movable valve member and shear member are all cylindrical.

4. The valve member of claim 1 further characterized in that said movable valve member includes outlet means, and said fixed valve member has spaced inlet means, one for cold water and one for hot water, and wherein upon said sliding movement of said movable valve member relative to said fixed valve member, said valve performs a mixing function of said cold and hot water.

5. The mixing valve of claim 1 further characterized in that said shear member is generally cylindrical in form, has inlet port means positioned in register with said fixed member inlet means and has an outwardly extending annular rim held by said sleeve.

* * * * *